(12) United States Patent
Bolt et al.

(10) Patent No.: US 10,336,863 B2
(45) Date of Patent: Jul. 2, 2019

(54) CURABLE COMPOSITION HAVING A SPECIAL CATALYST/SOFTNER SYSTEM

(71) Applicant: Henkel AG & Co. KGaA, Duesseldorf (DE)

(72) Inventors: Andreas Bolt, Solingen (DE); Nick Spielkamp, Essen (DE); Thomas Tamcke, Duesseldorf (DE); Patrick Gawlik, Duesseldorf (DE); Lars Zander, Neuotting (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 28 days.

(21) Appl. No.: 13/839,697

(22) Filed: Mar. 15, 2013

(65) Prior Publication Data

US 2013/0274414 A1 Oct. 17, 2013

Related U.S. Application Data

(63) Continuation of application No. PCT/EP2011/066119, filed on Sep. 16, 2011.

(30) Foreign Application Priority Data

Oct. 5, 2010 (DE) .......................... 10 2010 041 978

(51) Int. Cl.
C08L 101/10 (2006.01)
C08G 65/00 (2006.01)
C09J 201/10 (2006.01)

(52) U.S. Cl.
CPC ............ C08G 65/00 (2013.01); C08L 101/10 (2013.01); C09J 201/10 (2013.01)

(58) Field of Classification Search
CPC .................................................. C08L 101/10
See application file for complete search history.

(56) References Cited

U.S. PATENT DOCUMENTS

| | | | |
|---|---|---|---|
| 5,539,017 A | 7/1996 | Rheinberger et al. | |
| 7,332,541 B2 | 2/2008 | Schindler et al. | |
| 7,816,553 B2 | 10/2010 | Storzum et al. | |
| 7,960,459 B2 | 6/2011 | Noro et al. | |
| 8,680,184 B2 * | 3/2014 | Yano ................... | C08G 18/4854 524/115 |
| 8,853,309 B2 * | 10/2014 | Yano et al. .................... | 524/115 |
| 2006/0111505 A1 | 5/2006 | Schindler et al. | |
| 2010/0063178 A1 | 3/2010 | Hogan et al. | |
| 2010/0216925 A1 | 8/2010 | Yano | |
| 2010/0249466 A1 * | 9/2010 | Tobita .................. | B41M 5/3375 568/720 |
| 2011/0232825 A1 | 9/2011 | Mack et al. | |
| 2012/0138206 A1 | 6/2012 | Wagner et al. | |

FOREIGN PATENT DOCUMENTS

| | | | |
|---|---|---|---|
| DE | 1402766 A1 | 7/1995 | |
| DE | 4402766 A1 | 7/1995 | |
| DE | 10237271 A1 | 3/2004 | |
| DE | 102010002808 A1 | 9/2011 | |
| EP | 1041119 A2 | 4/2000 | |
| EP | 1535940 A1 | 1/2005 | |
| EP | 1816168 A1 | 8/2007 | |
| EP | 1939256 A1 | 7/2008 | |
| EP | 1985666 A1 | 10/2008 | |
| EP | 1930376 A1 | 11/2008 | |
| EP | 1988127 A1 | 11/2008 | |
| EP | 1990370 A1 | 11/2008 | |
| EP | 1990371 A1 | 11/2008 | |
| EP | 1992665 A1 | 11/2008 | |
| EP | 2177571 A1 | 4/2010 | |
| EP | 2338938 A1 | 6/2011 | |
| EP | 2388297 A1 | 11/2011 | |
| EP | 2100923 B1 | 3/2013 | |
| EP | 2813528 A | 12/2014 | |
| JP | 2010095704 A | 4/2010 | |
| JP | WO 2010035821 A1 * | 4/2010 | .......... C08J 18/4854 |
| WO | 2005/047394 A1 | 5/2005 | |
| WO | 2005100482 A1 | 10/2005 | |

(Continued)

OTHER PUBLICATIONS

International Search Report for PCT/EP2011/066119, 2 pages, dated Jan. 17, 2012.
Bona R850 Technisches Merkblatt Unterboden Product Sheet, Nov. 2010.
Petrochemicals Hexamoll DINCH, BASF Corporation Technical Information Sheet, Feb. 2015.
Hexamoll DINCH, The trusted non-phthalate plasticizer, BASF reference.

(Continued)

*Primary Examiner* — Michael F Pepitone
(74) *Attorney, Agent, or Firm* — James E. Piotrowski

(57) ABSTRACT

In a curable composition that contains at least one polymer having at least one terminal group of the general formula (I)

$$\text{-A}_n\text{-R-SiXYZ} \qquad \text{(I),}$$

at least one cyclic compound that contains at least one structural motif of formula (II) as a constituent of the ring structure; and at least one cyclohexanedicarboxylic acid dialkyl ester in which the alkyl residues of the ester groups each, mutually independently, contain 1 to 20 carbon atoms. The curable composition can be used as an adhesive, sealant, and/or coating material. A combination of a cyclohexanedicarboxylic acid dialkyl ester, in which the alkyl residues of the ester groups each, mutually independently, contain 1 to 20 carbon atoms and a cyclic compound that contains at least one structural motif of the general formula (II) as a constituent of the ring structure, as a plasticizer/curing catalyst system in curable compositions.

11 Claims, 1 Drawing Sheet

(56) References Cited

FOREIGN PATENT DOCUMENTS

| WO | 2005123821 A2 | 12/2005 | |
|---|---|---|---|
| WO | 2007094273 A1 | 8/2007 | |
| WO | 2009011329 A1 | 1/2009 | |
| WO | 2009127582 A2 | 10/2009 | |
| WO | WO 2010035820 A1 * | 4/2010 | ............... C09K 3/10 |
| WO | 2010/063740 A1 | 6/2010 | |
| WO | 2010063740 A1 | 6/2010 | |

OTHER PUBLICATIONS

DESMOSEAL S XP 2458, Silane-terminated Polyurethane Prepolymer, Bayer MaterialScience, D2a Product Information Sheet, Aug. 2008.
One-pack STP-sealant Shore A 35, Desmoseal S XP 2636, Bayer MaterialScience, MMX 1577/1, Laboratory formulation, Jan. 29, 2009.
Lupragen N 700, 1,8-Diazabicyclo-5,4,0-undecene-7, Technical Data Sheet, BASF Corporation, D2b reference, Oct. 2007.
Desmoseal S, Silane-terminated polyurethanes for sealants & adhesives, Bayer MaterialScience, D41 reference, Mar. 2013.
Matner et al., Desmoseal Silane Terminated Prepolymers, Bayer MaterialScience D2d reference, pp. 1-45, Apr. 8, 2008.
Bona R855, B228-V40, Blauer Engel, D2e reference.
Die Kunststoffe und ihre Eigenschaften, Peter Eyerer et al., Springer, D8 reference, pp. 1500-1505, Nov. 21, 2016.
Hexamoll DINCH, Petrochemikalien Technisches Merkblatt, D2c reference, BASF The Chemical Company, Sep. 2005, pp. 1-4.
Bona R855 Technisches Merkblatt, Unterboden reference, Nov. 7, 2012.
Bestimmung der Migration von Siloxanen aus Silikonbedarfsgegenstaenden in verschiedene Lebensmittel, Lebensmittelchemie 62, pp. 145-168 (2008).
Bona R850 Technisches Merkblatt Unterboden Product Sheet.
Petrochemicals Hexamoll DINCH, BASF Technical Data Sheet.
DESMOSEAL S XP 2458, Silane-terminated Polyurethane Prepolymer, Bayer MaterialScience D2a, Product Information Sheet.
One-pack STP-sealant Shore A 35, Desmoseal S XP 2636, Bayer MaterialScience MMX 1577/1, Laboratory formulation.
Lupragen N 700, 1,8-Diazabicyclo-5,4,0-undecene-7, Technical Data Sheet, BASF Corporation D2b reference.
Hexamoll DINCH, BASF Corporation, Petrochemicals Technical Information.
Matner et al., Desmoseal Silane Terminated Prepolymers, Bayer MaterialScience D2d reference, pp. 1-45.
Die Kunststoffe und ihre Eigenschaften, Peter Eyerer et al., Springer, D8 reference, pp. 1500-1505.
Hexamoll DINCH, Petrochemikalien Technisches Merkblatt, D2c reference, Basf the Chemical Company, pp. 1-4.
Bona R855 Technisches Merkblatt, Unterboden reference.
Datenblatt zu Hexamoll OINCH von BASF vom Sep. 2005.
Datenblatt zu Lupragen N 700 von BASF vom Oct. 2007.
Bescheid DPMA zum Priodokument.
Datenblatt zu Hexamoll.

* cited by examiner

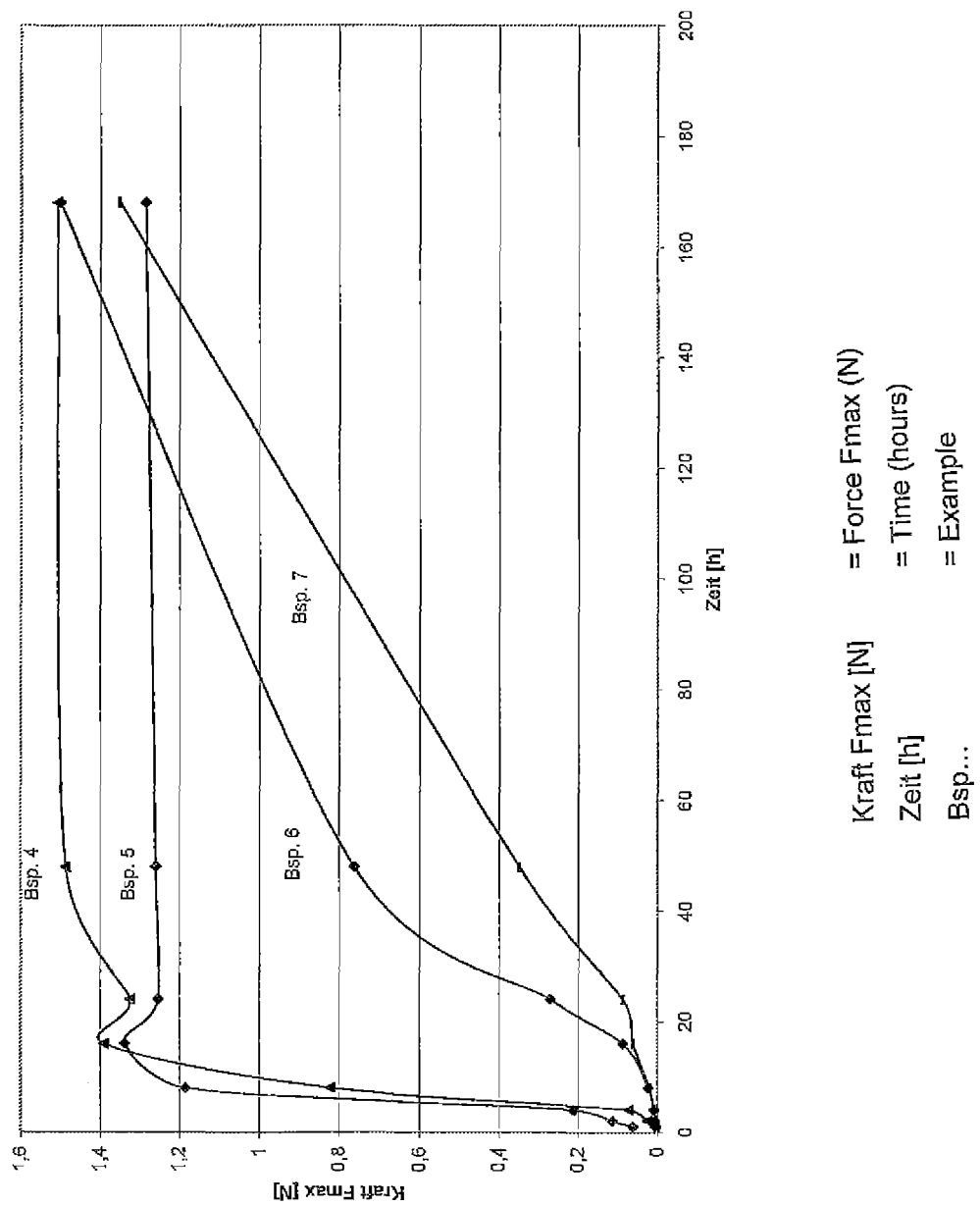

CURABLE COMPOSITION HAVING A SPECIAL CATALYST/SOFTNER SYSTEM

This application is a continuing application of International Application No. PCT/EP2011/066119, filed 2011, Sep. 16, which claims the benefit of German Application No. 102010041978.8, filed 2010, Oct. 5, the contents of each of which is incorporated by reference herein.

The present invention relates to the sector of curable compositions such as those used, for example, in adhesives, sealants, and coating materials. The invention relates in particular to moisture-curable compositions based on silane-terminated polymers, and proposes the use of a special curing catalyst/plasticizer system. The invention further relates to the use of such compositions as an adhesive, sealant, and/or coating material.

One-component, moisture-curing adhesives and sealants have for years played a significant role in numerous technical applications. In addition to the polyurethane adhesives and sealants having free isocyanate groups, and the traditional silicone adhesives and sealants based on dimethylpolysiloxanes, the so-called silane-modified adhesives and sealants have also been increasingly used recently. The silane-modified adhesives and sealants have the advantage, as compared with the polyurethane adhesives and sealants, of being free of isocyanate groups, in particular of monomeric diisocyanates. They are also notable for a broad adhesion spectrum to a plurality of substrates without surface pretreatment using primers.

Polymer systems that possess reactive silyl groups are therefore known in principle. In the presence of atmospheric moisture, polymers that possess silyl groups having hydrolyzable substituents are capable, even at room temperature, of condensing with one another with release of the hydrolyzed residues. Depending on the concentration of silyl groups having hydrolyzable substituents, and on the configuration of those silyl groups, what forms in this context are principally long-chain polymers (thermoplastics), relatively wide-mesh three-dimensional networks (elastomers), or highly crosslinked systems (thermosetting plastics). The polymers generally comprise an organic backbone that carries at the ends, for example, alkoxy- or acyloxysilyl groups. The organic backbone can involve, for example, polyurethanes, polyesters, polyethers, etc.

EP 1 535 940 B1 describes a method for manufacturing crosslinkable substances, in which in a first step, organylsilyl-terminated polymers are produced by reacting dihydroxy-terminated polymers with isocyanato-functional silanes, and in the second step the latter are mixed with a silane condensation catalyst and optionally with further substances.

A curable composition based on silyl groups that can crosslink by forming siloxane bonds is also the subject of EP 1 930 376 A1, in which an amine compound constituting a silanol condensation catalyst is listed as a further constituent.

A crosslinkable polymer composition based on silane-terminated polymers that comprise mixed oxyalkylene units in the polymer backbone is described in WO 2005/047394 A1.

Plasticizers, inter alia, are used to improve the properties, for example the processability, of the silane-terminated compositions. Commonly used plasticizers are, for example, the esters of phthalic acid (phthalates), although they are being viewed increasingly critically because of their toxicological potential. Alternative plasticizers are therefore being sought.

EP 1 041 119 A2 describes a curable composition that, besides an organic polymer having at least one reactive silyl group, a further compound having a reactive silyl group, and a tin catalyst, also encompasses a plasticizer that does not contain a phthalate structure.

The subject matter of WO 2010/063740 A1 is an adhesive or sealant that contains a silylated polyurethane, polysulfide, or polyacrylate or a silylated polyurea or polyether, as well as a cyclohexanepolycarboxylic acid derivative.

A need continues to exist for compositions, based on silylated polymers, that are largely unobjectionable from a toxicological standpoint and that meet all the criteria for a modern adhesive, sealant, and coating material. In particular, there is often a demand for formulations that yield a sufficiently hard substance after curing and at the same time exhibit good elasticity values.

Among the criteria for a modern adhesive, sealant, and coating material is rapid curing, for example so that the time required in order to immobilize substrates connected to one another can be kept short. The formulations therefore as a rule have catalysts added to them which accelerate the silane condensation that results in crosslinking resp. curing. As may be gathered from the documents mentioned above, these are often organotin compounds. Many tin organyls have attracted criticism, however, because of physiological and environmental objections. Alternative catalysts either have proven to be not active enough or exhibit undesired side effects, for example a pronounced tendency to migrate.

Many non-organotin catalysts thus tend, when used in moisture-curing silane-based compositions, to "sweat" out of the products produced with the composition once it has cured. When used in construction sealants, for example, the result can be the formation, on the surface of the product, of an obtrusive greasy film that on the one hand can attack the surrounding materials (e.g. wood, sensitive metals), and on the other hand causes adverse visual effects (e.g. by absorbing dirt). When used in adhesives, a migration of the catalysts into the adhesively bonded materials is often observed and can lead to undesired adverse effects on the materials (e.g. discoloration).

The object of the present invention is therefore to make available a curable composition that cures quickly, exhibits good hardness after crosslinking, at the same time exhibits improved extensibility, and can be used largely without objections in terms of health aspects. In addition, problems caused by catalyst migration, such as formation of a greasy film on the substrate surfaces or discoloration of materials, are to be avoided.

FIG. 1 shows the values, ascertained in accordance with a method described herein, for breaking strength as a function of time at which the measurement was carried out.

It has been found, surprisingly, that this object can be achieved by the use of a special catalyst/plasticizer combination. The subject matter of the invention is therefore a curable composition that contains at least A) at least one polymer having at least one terminal group of the general formula (I)

$$-A_n\text{-R—SiXYZ} \qquad (I),$$

in which
 A is a divalent bonding group containing at least one heteroatom,
 R is a divalent hydrocarbon residue having 1 to 12 carbon atoms, and
 X, Y, Z are substituents on the Si atom and, mutually independently, are $C_1$ to $C_8$ alkyl, $C_1$ to $C_8$ alkoxy, or $C_1$ to $C_8$ acyloxy groups, where at least one of the residues X, Y, Z is a $C_1$ to $C_8$ alkoxy or $C_1$ to $C_8$ acyloxy group, and n is 0 or 1;

B) at least one cyclic compound that contains at least one structural motif of formula (II)

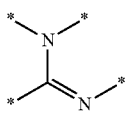

(II)

as a constituent of the ring structure; and

C) at least one cyclohexanedicarboxylic acid dialkyl ester in which the alkyl residues of the ester groups each, mutually independently, contain 1 to 20 carbon atoms.

A composition of this kind exhibits good Shore A hardness parameters after curing, and moreover possesses outstanding elasticity. The composition also cures rapidly and exhibits no phenomena that can be attributed to catalyst migration.

A "composition" is understood in the context of the present invention as a mixture of at least two ingredients.

The term "curable" is to be understood to mean that under the influence of external conditions, in particular under the influence of moisture present in the environment and/or deliberately delivered, the composition can transition from a relatively soft, optionally plastically deformable state into a harder state. Crosslinking can occur in general as a result of chemical and/or physical influences, i.e. besides the previously mentioned moisture also, for example, as a result of the delivery of energy in the form of heat, light, or other electromagnetic radiation, but also by simply bringing the composition into contact with air or with a reactive component.

The polymer listed under A) above, having at least one terminal group of the general formula (I), is preferably a polyether or a poly(meth)acrylic acid ester.

A "polyether" is understood as a polymer whose organic repeating units contain C—O—C ether functionalities in the main chain. Polymers having lateral ether groups, such as e.g. cellulose ethers, starch ethers, and vinyl ether polymers, are therefore not included among the polyethers. Polyacetals, such as polyoxymethylene (POM), are also not generally categorized as polyethers.

A "poly(meth)acrylic acid ester" is understood as a polymer that is based on (meth)acrylic acid esters, which therefore comprises as a repeating unit the structural motif —$CH_2CR^a(COOR^b)$—, in which $R^a$ denotes a hydrogen atom (acrylic acid ester) or a methyl group (methacrylic acid ester), and $R^b$ denotes linear, branched, and/or cyclic alkyl residues and/or also ones containing functional substituents, for example methyl, ethyl, isopropyl, cyclohexyl, 2-ethylhexyl, or 2-hydroxyethyl residues.

Particularly preferably, the polymer having at least one terminal group of the general formula (I) is a polyether. Polyethers have a flexible and elastic structure with which compositions that have outstanding elastic properties can be manufactured. Polyethers are not only flexible in their backbone, but also at the same time strong. For example, polyethers (in contrast to e.g. polyesters) are not attacked or decomposed by water and bacteria.

The number-average molecular weight $M_n$ of the polyether on which the polymer is preferably based is by preference equal to 2000 to 100,000 g/mol (daltons), the molecular weight being equal particularly preferably to at least 6000 g/mol and in particular at least 8000 g/mol. Number-average molecular weights of at least 2000 g/mol are advantageous for the polyethers of the present invention because compositions according to the present invention based on polyethers having this minimum molecular weight exhibit significant film-forming properties. The number-average molecular weight $M_n$ of the polyether is, for example, 4000 to 100,000, by preference 8000 to 50,000, particularly preferably 10,000 to 30,000, in particular 17,000 to 27,000 g/mol. These molecular weights are particularly advantageous because the corresponding compositions exhibit a balanced relationship between viscosity (easy processability), strength, and elasticity. This combination is particularly advantageously expressed in a molecular weight range from 18,000 to 26,000, in particular from 20,000 to 24,000 g/mol.

Particularly advantageous viscoelastic properties can be achieved if polyethers that possess a narrow molar mass distribution, and thus a low polydispersity, are used. These can be manufactured, for example, using so-called double metal cyanide (DMC) catalysis. Polyethers manufactured in this manner are notable for a particularly narrow molecular weight distribution, a high average molar mass, and a very small number of double bonds at the ends of the polymer chains.

In a special embodiment of the present invention, the maximum polydispersity ($M_w/M_n$) of the polyether on which polymer A is based is therefore equal to 3, particularly preferably 1.7, and very particularly preferably 1.5.

The "molecular weight $M_n$" is understood as the number-average molecular weight of the polymer. This, like the weight-average molecular weight $M_w$, can be determined according to the present invention by gel permeation chromatography (GPC, also called SEC). This method is known to one skilled in the art. The polydispersity is derived from the average molecular weights $M_w$ and $M_n$. It is calculated as $PD=M_w/M_n$.

The ratio $M_w/M_n$ (polydispersity) indicates the breadth of the molar mass distribution and thus the differing degrees of polymerization of the individual chains in polydisperse polymers. For many polymerizates and polycondensates, the applicable polydispersity value is approximately 2. Strict monodispersity would exist for a value of 1. A low polydispersity (for example, less than 1.5) indicates a comparatively narrow molecular weight distribution and thus the specific expression of properties associated with molecular weight, for example viscosity. The polyether on which polymer A is based therefore has in the context of the present invention, in particular, a polydispersity ($M_w/M_n$) of less than 1.3.

The at least one polymer of the curable composition according to the present invention comprises at least one terminal group of the general formula (I)

in which

A is a divalent bonding group containing at least one heteroatom,

R is a divalent hydrocarbon residue having 1 to 12 carbon atoms, and

X, Y, Z are substituents on the Si atom and, mutually independently, are $C_1$ to $C_8$ alkyl, $C_1$ to $C_8$ alkoxy, or $C_1$ to $C_8$ acyloxy groups, where at least one of the residues X, Y, Z is a $C_1$ to $C_8$ alkoxy or $C_1$ to $C_8$ acyloxy group, and n is 0 or 1.

The "divalent" (or "double-bond") bonding group A containing at least one heteroatom is understood as a divalent chemical group that links the polymer skeleton of the alkoxy- and/or acyloxysilane-terminated polymer to the residue R of the terminal group. The divalent bonding group A can be formed, for example, in the context of manufacture of the alkoxy- and/or acyloxysilane-terminated polymer, for example as an amide group resp. urethane group by reaction between a polyether, functionalized with hydroxy groups, and an isocyanatosilane. The divalent bonding group can be both distinguishable and indistinguishable from structural features occurring in the basic polymer skeleton. The latter situation exists, for example, when it is identical to the linking points of the repeating units of the polymer skeleton.

The index "n" corresponds to 0 (zero) or to 1, i.e. the divalent bonding group A links the polymer backbone to the residue R (n=1) or the polymer backbone is connected resp. linked directly to the residue R (n=0).

The divalent bonding group A in the general formula (I) is preferably an oxygen atom or an —NR'— group, in which R' is a hydrogen atom or an alkyl or aryl residue having 1 to 12 carbon atoms, or the divalent bonding group A contains an amide, carbamate, urea, imino, carboxylate, carbamoyl, amidino, carbonate, sulfonate, or sulfinate group. Urethane and urea groups, which can be obtained by reacting specific functional groups of a prepolymer with an organosilane that carries a further functional group, are particularly preferred as a bonding group A. Urethane groups can be produced, for example, either when the polymer skeleton contains terminal hydroxyl groups and when isocyanatofunctional alkoxysilanes are used as a further component, or when, conversely, a polymer that comprises terminal isocyanate groups is reacted with an alkoxysilane containing terminal hydroxy groups. Urea groups can be obtained in similar fashion when a terminal primary or secondary amino group (either on the silane or on the polymer), which reacts with a terminal isocyanate group present in the respective reaction partner, is used. This means that a reaction is brought about either between an aminosilane and a polymer comprising terminal isocyanate groups, or between an isocyanatosilane and a polymer terminally substituted with an amino group.

Urethane groups and urea groups advantageously increase the strength of the polymer chains and of the entire cross-linked polymer.

The residue R is a divalent hydrocarbon residue having 1 to 12 carbon atoms. The hydrocarbon residue can be a straight-chain, branched, or cyclic alkylene residue. The hydrocarbon residue can be saturated or unsaturated. R is preferably a divalent hydrocarbon residue having 1 to 6 carbon atoms. The curing speed of the composition can be influenced by way of the length of the hydrocarbon residues that form one of the bonding members, resp. the bonding member, between the polymer skeleton and the silyl residue. R is particularly preferably a methylene, ethylene, or n-propylene group, in particular a methylene or n-propylene residue. Alkoxysilane-terminated compounds having a methylene group as a bonding member to the polymer skeleton—called "alpha-silanes"—exhibit particularly high reactivity in the terminating silyl group, which results in shortened setting times and thus in very rapid curing of formulations based on such polymers.

In general, a lengthening of the connecting hydrocarbon chain results in decreased reactivity of the polymers. The gamma-silanes in particular, which contain the unbranched propylene residue as a bonding member, exhibit a balanced relationship between necessary reactivity (acceptable curing times) and delayed curing (open time, capability for correction once bonding has occurred). The curing speed of the systems can thus be influenced as desired by deliberately combining alpha- and gamma-alkoxysilane-terminated components.

The substituents X, Y, and Z connected directly to the Si atom are, mutually independently, $C_1$ to $C_8$ alkyl, $C_1$ to $C_8$ alkoxy, or $C_1$ to $C_8$ acyloxy residues. At least one of the residues X, Y, Z must be a hydrolyzable group, i.e. a $C_1$ to $C_8$ alkoxy residue or a $C_1$ to $C_8$ acyloxy residue. Alkoxy groups, in particular methoxy, ethoxy, i-propyloxy, and i-butyloxy groups, are by preference selected as hydrolyzable groups. This is advantageous because compositions containing alkoxy groups do not, upon curing, release any substances that irritate the mucous membranes. The alcohols that are formed by hydrolysis of the residues are harmless in the quantities released, and evaporate. Such compositions are therefore particularly suitable for the do-it-yourself sector. Acyloxy groups can also be used as hydrolyzable groups, however, for example an acetoxy group —O—CO—$CH_3$.

The alkoxy- and/or acyloxysilane-terminated polymer(s) preferably comprise(s) at least two terminal groups of the general formula (I). Each polymer chain thus contains at least two linking sites at which condensation of the polymers can take place in the presence of atmospheric moisture, with release of the hydrolyzed residues. Well-controlled and rapid crosslinking capability can thereby be achieved, so that bonds with good strength values can be obtained. In addition, the configuration of the achievable network as a long-chain system (thermoplastics), relatively wide-mesh three-dimensional network (elastomers), or highly crosslinked system (thermosetting plastics) can be controlled by way of the quantity and structure of the hydrolyzable groups (e.g. by the use of di- or trialkoxysilyl groups, methoxy groups, or longer residues, etc.), so that the elasticity, flexibility, and high-temperature strength, among other characteristics, of the completely crosslinked compositions can thereby be influenced.

Preferably X is an alkyl group and Y and Z are mutually independently an alkoxy group; or X, Y, and Z are each, mutually independently, an alkoxy group. In general, polymers that contain di-resp. trialkoxysilyl groups possess highly reactive linking sites that enable rapid curing, high degrees of crosslinking, and thus good final strength values. The particular advantage of dialkoxysilyl groups is that the corresponding compositions are, after curing, more elastic, softer, and more flexible than systems containing trialkoxysilyl groups. They are therefore particularly suitable for use as sealants. They furthermore release even less alcohol during curing, and are therefore of particular interest when the quantity of alcohol released needs to be reduced.

With trialkoxysilyl groups, on the other hand, a higher degree of crosslinking can be achieved, which is particularly advantageous if a harder, more solid substance is desired after curing. Trialkoxysilyl groups are moreover more reactive, i.e. crosslink more quickly, and thus decrease the quantity of catalyst required; and they have advantages in terms of "cold flow," i.e. the dimensional stability of a corresponding adhesive under the influence of force and, if applicable, temperature.

Particularly preferably, the residues X, Y, and Z in the general formula (I) are, mutually independently in each case, a methyl group, an ethyl group, a methoxy group, or an ethoxy group. Methoxy and ethoxy groups, being comparatively small hydrolyzable groups having a low steric demand, are highly reactive and thus enable rapid curing even when little catalyst is used. They are therefore of interest in particular for systems in which rapid curing is desired, for example in the case of adhesives that are intended to exhibit high initial adhesion.

Particularly preferably, X, Y, and Z, mutually independent in each case, are a methyl group or a methoxy group, at least one of the residues being a methoxy group. Compounds having alkoxysilyl groups have different levels of reactivity in chemical reactions depending on the nature of the alkyl residues on the oxygen atom. Among the alkoxy groups, the methoxy group exhibits the greatest reactivity. Silyl groups of this kind can thus be resorted to when particularly rapid curing is desired. Higher aliphatic residues, such as ethoxy, already produce a lower reactivity in the terminal alkoxysilyl group as compared with methoxy groups, and can be used advantageously to implement graduated crosslinking rates.

Interesting configuration possibilities are also offered by combinations of the two groups. If methoxy is selected for X and ethoxy for Y within the same alkoxysilyl group, for example, the desired reactivity of the terminating silyl groups can adjusted with particular precision if silyl groups carrying exclusively methoxy groups are perceived to be too reactive, and the silyl groups carrying ethoxy groups too inactive, for the intended purpose.

In addition to methoxy and ethoxy groups, larger residues (which, naturally have lower reactivity) can of course also be used as hydrolyzable groups. This is of interest in particular when delayed curing is also intended to be achieved by way of the configuration of the alkoxy groups.

The proportion of the total quantity of polymers having at least one terminal group of the general formula (I) in the composition according to the present invention is preferably 5 to 75 wt %, particularly preferably 10 to 50 wt %, for example 12 to 35 wt %, in particular 15 to 25 wt %, based in each case on the total weight of the curable composition.

The composition according to the present invention contains B) at least one cyclic compound that contains at least one structural motif of formula (II)

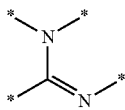

as a constituent of the ring structure. The positions in formula (II) labeled with a "*" correspond to further ring atoms or to any other atoms. A "cyclic" compound is understood as a compound in which at least some atoms are arranged into one or more ring structure(s). The feature "as a constituent of the ring structure" is to be understood to mean that in the context of the present invention, the N—C=N sequence of formula (II) is obligatorily a constituent of such a ring structure, which can be a monocycle or a bicyclic or polycyclic structure. Both of the nitrogen atoms and the carbon atom of this sequence are therefore ring atoms. Cyclic compounds that contain a structure according to formula (II) have proven to be particularly suitable crosslinking catalysts resp. curing catalysts.

Examples of heterocyclic compounds of this kind that are usable according to the present invention are 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine, and 1-ethyl-2-isopropyl-1,4,5,6-tetrahydropyrimidine; cyclic guanidine compounds such as 1,5,7-triazabicyclo[4.4.0]dec-5-ene, 7-methyl-1,5,7-triazabicyclo[4.4.0]dec-5-ene, 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene, and 7-decyl-1,5,7-triazabicyclo[4.4.0]dec-5-ene; as well as 1,5-diazabicyclo[4.3.0]non-5-ene (DBN) and 1,8-diazabicyclo(5.4.0)undec-7-ene (DBU). The composition according to the present invention preferably contains 1,5-diazabicyclo[4.3.0]non-5-ene (DBN) and/or 1,8-diazabicyclo(5.4.0)undec-7-ene (DBU), and particularly preferably 1,8-diazabicyclo(5.4.0)undec-7-ene (DBU), as at least one compound that contains at least one structural motif of the formula (II) as a constituent of the ring structure.

The total quantity in the curable composition according to the present invention of cyclic compounds that contain at least one structural motif of formula (II) as a constituent of the ring structure is preferably 0.01 to 1 wt %, with greater preference 0.02 to 0.5 wt %, for example 0.03 to 0.3 wt %, in particular 0.04 to 0.2 wt %, based in each case on the total weight of the composition.

A further constituent of the curable composition according to the present invention is C) at least one cyclohexanedicarboxylic acid dialkyl ester in which the alkyl residues of the ester groups each, mutually independently, contain 1 to 20 carbon atoms. The "alkyl residue of the ester group" is understood as the residue R" in an ester group of the general formula —C(O)OR". In accordance with the subject matter of the present invention, the R" in each ester group is, mutually independently, an alkyl group having 1 to 20 carbon atoms.

The alkyl residues of the ester groups are preferably, mutually independently in each case, alkyl groups having 4 to 15 carbon atoms, more preferably alkyl residues having 6 to 12 carbon atoms, such as e.g. n-hexyl, i-hexyl, n-heptyl, i-heptyl, n-octyl, i-octyl, n-nonyl, i-nonyl, n-decyl, i-decyl, n-undecyl, and i-undecyl groups. Particularly preferably, the alkyl residues of the ester groups are, mutually independently in each case, alkyl groups having 8 to 10 carbon atoms, in particular having 9 carbon atoms, for example n-nonyl groups and i-nonyl groups.

The cyclohexanedicarboxylic acid dialkyl ester preferably has identical alkyl residues in the ester groups.

With regard to the position of the ester groups on the cyclohexane ring, cyclohexane-1,4-dicarboxylic acid dialkyl esters, cyclohexane-1,3-dicarboxylic acid dialkyl esters, as well as cyclohexane-1,2-dicarboxylic acid dialkyl esters are possible; cyclohexane-1,2-dicarboxylic acid dialkyl esters, in which the ester groups are thus localized on adjacent ring carbon atoms, are preferred.

The curable composition according to the present invention preferably contains, as at least one cyclohexanedicarboxylic acid dialkyl ester in which the alkyl residues of the ester groups each, mutually independently, contain 1 to 20 carbon atoms, cyclohexane-1,2-dicarboxylic acid diisononyl ester, also referred to as diisononylcyclohexane-1,2-dicarboxylic acid ester (DINCH). This compound has proven to be particularly suitable for imparting good processability and applicability, as well as outstanding elastic properties, to the curable compositions of the present invention, and moreover contributes advantageously to expression of the balanced relationship between the hardness and elasticity of the composition after curing. The proportion of the total quantity of cyclohexanedicarboxylic acid dialkyl esters in which the alkyl residues of the ester groups each, mutually independently, contain 1 to 20 carbon atoms, in terms of the curable composition according to the present invention, is by preference 1 to 45 wt %, with greater preference 10 to 40 wt %, for example 15 to 38 wt %, in particular 20 to 30 wt %, based in each case on the total weight of the composition.

It has been found that when the cyclohexanedicarboxylic acid dialkyl esters are used in combination with the cyclic substances that contain at least one structural motif of formula (II), "sweating" resp. migration of these N-heterocyclic catalysts is not observed, and the disadvantages associated with these phenomena are avoided. This is a significant advantage of the present invention, since it is thereby possible, while omitting phthalates and organotin catalysts but while retaining advantageous technical properties, to manufacture and utilize compositions that are toxicologically and environmentally largely unobjectionable. In a special embodiment of the present invention, the curable composition is therefore free of phthalic acid esters and of organotin compounds.

The feature "free of phthalic acid esters and of organotin compounds" is to be understood, for purposes of the present invention, to mean that a residual weight proportion of <50 ppm, preferably <40 ppm, in particular <10 ppm is still respectively permissible, based in each case on the total weight of the curable composition.

It may nevertheless be necessary to add one or more further known plasticizers in order to adjust the elastic properties and to improve the processability of the composition. A "plasticizer" is understood as a substance that decreases the viscosity of the composition and thus simplifies the processability, and moreover improves the flexibility and extension capability, of the compositions.

The plasticizer is preferably selected from a fatty acid ester, a dicarboxylic acid ester (except for cyclohexanedicarboxylic acid dialkyl esters), an ester of OH-group-carrying or epoxidized fatty acids, a fat, a glycolic acid ester, a benzoic acid ester, a phosphoric acid ester, a sulfonic acid ester, a trimellitic acid ester, an epoxidized plasticizer, a polyether plasticizer, a polystyrene, a hydrocarbon plasticizer, and a chlorinated paraffin, as well as mixtures of two or more thereof. Targeted selection of one of these plasticizers, or of a specific combination, allows further advantageous properties of the composition according to the present invention, e.g. the gelling capability of the polymers, low-temperature elasticity resp. low-temperature strength, or even antistatic properties, to be attained.

Of the polyether plasticizers, it is preferred to use endcapped polyethylene glycols, for example polyethylene glycol di-$C_{1-4}$ alkyl ethers or polypropylene glycol di-$C_{1-4}$ alkyl ethers, in particular the dimethyl or diethyl ethers of diethylene glycol or dipropylene glycol, as well as mixtures of two or more thereof. Also suitable as plasticizers are, for example, esters of abietic acid, butyric acid esters, acetic acid esters, propionic acid esters, thiobutyric acid esters, citric acid esters, and esters based on nitrocellulose and polyvinyl acetate, as well as mixtures of two or more thereof. Also suitable are, for example, the asymmetrical esters of adipic acid monooctyl ester with 2-ethylhexanol (Edenol DOA, Cognis Deutschland GmbH, Düsseldorf). The pure or mixed ethers of monofunctional, linear or branched $C_{4-16}$ alcohols, or mixtures of two or more different ethers of such alcohols, for example dioctyl ethers (obtainable as Cetiol OE, Cognis Deutschland GmbH, Düsseldorf), are also suitable as plasticizers. Likewise suitable in the context of the present invention as plasticizers are diurethanes, which can be manufactured e.g. by reacting diols having OH terminal groups with monofunctional isocyanates, by selecting the stoichiometry so that substantially all free OH groups react completely. Any excess isocyanate can then be removed from the reaction mixture, for example, by distillation. A further method for manufacturing diurethanes involves reacting monofunctional alcohols with diisocyanates, such that all the NCO groups react as completely as possible.

Phthalic acid esters can in principle also be used as plasticizers, but because of their toxicological potential they are not preferred.

A viscosity of the composition according to the present invention that is too high for specific applications can also be decreased in simple and useful fashion by using a reactive diluent, without resulting in demixing phenomena (e.g. plasticizer migration) in the cured substance. The reactive diluent preferably comprises at least one functional group that reacts after application, for example, with moisture or with atmospheric oxygen. Examples of such groups are silyl groups, isocyanate groups, vinyl-unsaturated groups, and polyunsaturated systems. All compounds that are miscible with the composition according to the present invention accompanied by a decrease in viscosity, and that possess at least one group reactive with the binding agent, are suitable, alone or as a combination of multiple compounds, as reactive diluents. The viscosity of the reactive diluent is preferably less than 20,000 mPas, particularly preferably approximately 0.1 to 6000 mPas, very particularly preferably 1 to 1000 mPas (Brookfield RVT, 23° C., spindle 7, 10 rpm).

The following substances can be used, for example, as reactive diluents: polyalkylene glycols reacted with isocyanatosilanes (e.g. Synalox 100-50B, Dow), alkyltrimethoxysilane, alkyltriethoxysilane, such as methyltrimethoxysilane, methyltriethoxysilane, and vinyltrimethoxysilane (XL 10, Wacker), phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (10 Trimethoxy), isooctyltriethoxysilane (10 Triethoxy, Wacker), N-trimethoxysilylmethyl-O-methylcarbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of these compounds. Also usable as reactive diluents are the following polymers of Kaneka Corp.: MS S203H, MS S303H, MS SAT 010, and MS SAX 350. Also suitable as reactive diluents are polymers that can be manufactured from an organic backbone by grafting with a vinylsilane or by reacting with polyol, polyisocyanate, and alkoxysilane.

A "polyol" is understood as a compound that can contain one or more OH groups in the molecule. The OH groups can be both primary and secondary. Included among the suitable aliphatic alcohols are, for example, ethylene glycol, propylene glycol, and higher glycols, as well as other polyfunctional alcohols. The polyols can additionally contain further functional groups such as, for example, esters, carbonates, amides. For manufacture of a reactive diluent by reacting polyol with polyisocyanate and alkoxysilane, the corresponding polyol component is reacted respectively with an at least difunctional isocyanate. Any isocyanate having at least two isocyanate groups is appropriate in principle as an at least difunctional isocyanate, but compounds having two to four isocyanate groups, in particular having two isocyanate groups, are preferred as a rule in the context of the present invention.

The di- and trialkoxysilyl groups are preferred among the alkoxysilyl groups.

Suitable polyisocyanates for manufacturing a reactive diluent are, for example, ethylene diisocyanate, 1,4-tetramethylene diisocyanate, 1,4-tetramethoxybutane diisocyanate, 1,6-hexamethylene diisocyanate (HDI), cyclobutane 1,3-diisocyanate, cyclohexane 1,3- and 1,4-diisocyanate, bis(2-isocyanatoethyl) fumarate, as well as mixtures of two or more thereof, 1-isocyanato-3,3,5-trimethyl-5-isocyanatomethylcyclohexane (isophorone diisocyanate, IPDI), 2,4- and 2,6-hexahydrotoluoylene diisocyanate, hexahydro-1,3- or -1,4-phenylene diisocyanate, benzidine diisocyanate, naphthalene 1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluoylene diisocyanate (TDI), 2,4'-diphenylmethane diisocyanate, 2,2'-diphenylmethane diisocyanate, or 4,4'-diphenylmethane diisocyanate (MDI), or partially or completely hydrogenated cycloalkyl derivatives thereof, for example completely hydrogenated MDI (H12-MDI), alkyl-substituted diphenylmethane diisocyanates, for example mono-, di-, tri-, or tetraalkyldiphenylmethane diisocyanate as well as partially or completely hydrogenated cycloalkyl derivatives thereof, 4,4'-diisocyanatophenylperfluorethane, phthalic acid bisisocyanatoethyl ester, 1-chloromethylphenyl-2,4- or -2,6-diisocyanate, 1-bromomethylphenyl-2,4- or -2,6-diisocyanate, 3,3-bischloromethyl ether-4,4'-diphenyl-diisocyanate, sulfur-containing diisocyanates such as those obtainable by reacting 2 mol diisocyanate with 1 mol thiodiglycol or dihydroxyhexylsulfide, di- and triisocyanates of di- and trimer fatty acids, or mixtures of two or more of the aforesaid diisocyanates.

It is also possible to use as polyisocyanates trivalent or higher-valence isocyanates such as those obtainable, for example, by oligomerization of diisocyanates, in particular by oligomerization of the aforementioned isocyanates. Examples of such trivalent and higher-valence polyisocyanates are the triisocyanurates of HDI or IPDI or mixtures thereof, or mixed triisocyanurates thereof, as well as polyphenylmethylene polyisocyanate as obtainable by phosgenation of aniline-formaldehyde condensation products.

Solvents can also be used, alongside or instead of a reactive diluent, to reduce the viscosity of the composition according to the present invention. Aliphatic or aromatic hydrocarbons, halogenated hydrocarbons, alcohols, ketones, ethers, esters, ester alcohols, keto alcohols, keto ethers, keto esters, and ether esters are suitable as solvents. Alcohols are, however, used by preference, since shelf stability then rises. $C_1$ to $C_{10}$ alcohols, in particular methanol, ethanol, isopropanol, isoamyl alcohol, and hexanol, are particularly preferred.

The composition according to the present invention can furthermore encompass an adhesion promoter. An "adhesion promoter" is understood as a substance that improves the adhesion properties of adhesive layers onto surfaces. Usual adhesion promoters (tackifiers) known to one skilled in the art can be used, alone or as a combination of multiple compounds. Resins, terpene oligomers, coumaron/indene resins, aliphatic petrochemical resins, and modified phenol resins are, for example, suitable. Suitable in the context of the present invention are, for example, hydrocarbon resins such as those obtained by the polymerization of terpenes, chiefly α- or β-pinenes, dipentenes, or limonenes. Polymerization of these monomers is generally performed cationically, with initiation using Friedel-Crafts catalysts. Also included among the terpene resins, for example, are copolymers of terpenes and of other monomers, for example styrene, α-methylstyrene, isoprene, and the like. The aforesaid resins are utilized, for example, as adhesion promoters for contact adhesives and coating materials. Also suitable are the terpene-phenol resins that are produced by acid-catalyzed addition of phenols to terpenes or colophon. Terpene-phenol resins are soluble in most organic solvents and oils, and are miscible with other resins, waxes, and rubber. Also suitable in the context of the present invention as adhesion promoters in the aforementioned sense are the colophon resins and derivatives thereof, for example esters or alcohols thereof. Silane adhesion promoters, in particular aminosilanes, are particularly well suited.

In a special embodiment of the curable composition according to the present invention, the composition encompasses as an adhesion promoter a silane of the general formula (III)

$$R^1R^2\text{—}N\text{—}R^3\text{—}SiXYZ \quad (III),$$

in which $R^1$ and $R^2$ are, mutually independently, hydrogen or $C_1$ to $C_8$ alkyl residues, $R^3$ is a divalent hydrocarbon residue having 1 to 12 carbon atoms and optionally containing a heteroatom, and X, Y, Z are, mutually independently in each case, $C_1$ to $C_8$ alkyl, $C_1$ to $C_8$ alkoxy, or $C_1$ to $C_8$ acyloxy residues, where at least one of the residues X, Y, Z is a $C_1$ to $C_8$ alkoxy group or $C_1$ to $C_8$ acyloxy group. Such compounds of course have a high affinity for the bonding polymer components of the curable composition according to the present invention, but also for a wide spectrum of polar as well as nonpolar surfaces, and therefore contribute to the formation of particularly stable adhesion between the adhesive composition and the respective substrates to be bonded.

The bonding group $R^3$ can be, for example, a straight-chain or branched or cyclic, substituted or unsubstituted alkylene residue. Nitrogen (N) or oxygen (O) is optionally contained therein as a heteroatom. If X, Y, and/or Z is an acyloxy group, it can be, for example, the acetoxy group —OCO—$CH_3$.

One or more adhesion promoters preferably is/are contained in the curable composition according to the present invention, at a concentration of 0.1 to 5 wt %, with greater preference 0.2 to 2 wt %, in particular 0.3 to 1 wt %, based in each case on the total weight of the composition.

Fillers suitable for the composition according to the present invention are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, wood chips, chopped straw, chaff, ground walnut shells, and other chopped fibers. Short fibers such as glass fibers, glass filament, polyacrylonitrile, carbon fibers, Kevlar fibers, or also polyethylene fibers can also be added. Aluminum powder is likewise suitable as a filler. Also suitable as fillers are hollow spheres having a mineral shell or a plastic shell. These can be, for example, hollow glass spheres that are obtainable commercially under the trade names Glass Bubbles®.

Plastic-based hollow spheres are commercially obtainable, for example, under the designations Expancel® or Dualite®. They are made up of inorganic or organic substances and each have a diameter of 1 mm or less, preferably 500 μm or less. Fillers that impart thixotropy to the preparations are preferred for many applications. Such fillers are also described as rheological adjuvants, e.g. hydrogenated castor oil, fatty acid amides, or swellable plastics such as PVC. In order to be readily squeezable out of a suitable dispensing apparatus (e.g. a tube), such compositions possess a viscosity from 3000 to 15,000, preferably 4,000 to 8,000 mPas, or also 5,000 to 6,000 mPas.

The fillers are used by preference in a quantity from 1 to 80 wt %, with greater preference from 10 to 70 wt %, for example from 25 to 60 wt %, in particular from 35 to 55 wt %, based on the total weight of the composition according to the present invention. A single filler or a combination of multiple fillers can be used.

A highly dispersed silicic acid having a BET surface area form 10 to 500 m$^2$/g is used, for example, as a filler. When a silicic acid of this kind is used, it produces no substantial increase in the viscosity of the composition according to the present invention, but does contribute to reinforcing the cured preparation. This reinforcement improves, for example, the initial strength values, tensile shear strength, and adhesion of the adhesives, sealants, or coating materials in which the composition according to the present invention is used. Uncoated silicic acids having a BET surface area of preferably less than 100, with greater preference less than 65 m$^2$/g, and/or coated silicic acids having a BET surface area from 100 to 400, with greater preference from 100 to 300, in particular from 150 to 300, and very particularly preferably from 200 to 300 m$^2$/g are used.

Zeolites preferred for use are alkali aluminosilicates, for example sodium-potassium aluminosilicates of the general empirical formula $aK_2O*bNa_2O*Al_2O_3*2SiO*nH_2O$, where $0<a, b<1$, and $a+b=1$. The pore opening of the zeolite(s) used is preferably just large enough to accept water molecules. An effective pore opening of the zeolites of less than 0.4 nm is accordingly preferred. Particularly preferably, the effective pore opening is 0.3 nm +/−0.02 nm. Such (a) zeolite(s) is/are used preferably in the form of a powder.

Chalk is preferably used as a filler. Cubic, non-cubic, amorphous, and other modifications of calcium carbonate can be used as chalk. The chalks used are preferably surface-treated resp. coated. Fatty acids, fatty acid soaps, and fatty acid esters are preferably used as coating agents, for example lauric acid, palmitic acid, or stearic acid, sodium salts or potassium salts of such acids, or alkyl esters thereof. Also appropriate in addition, however, are other surface-active substances such as sulfate esters of long-chain alcohols or alkylbenzenesulfonic acids resp. sodium salts or potassium salts thereof, or also coupling reagents based on silanes or titanates. The surface treatment of the chalks is often associated with an improvement in processability and adhesive strength, and also in the weather resistance of the compositions. The coating agent is used usually at a proportion from 0.1 to 20 wt %, preferably 1 to 5 wt %, based on the total weight of the raw chalk.

Precipitated or ground chalks, or mixtures thereof, can be used depending on the desired properties profile. Ground chalks can be manufactured, for example, from natural lime, limestone, or marble by mechanical grinding; dry or wet methods can be utilized. Fractions having different average particle sizes are obtained depending on the grinding method. Advantageous specific surface area values (BET) are between 1.5 m$^2$/g and 50 m$^2$/g.

The composition according to the present invention can furthermore contain antioxidants. The proportion of antioxidants in the composition according to the present invention is by preference up to 7 wt %, in particular up to 5 wt %, based in each case on the total weight of the composition. The composition according to the present invention can moreover contain UV stabilizers. The proportion of UV stabilizers in the composition according to the present invention is by preference up to 2 wt %, in particular up to 1 wt %. The so-called hindered amine light stabilizers (HALS) are particularly suitable as UV stabilizers. It is preferred in the context of the present invention if a UV stabilizer that carries a silyl group, and that is incorporated into the end product upon crosslinking resp. curing, is used. The products Lowilite 75, Lowilite 77 (Great Lakes company, USA) are particularly suitable for this purpose. Benzotriazoles, benzophenones, benzoates, cyanoacrylates, acrylates, sterically hindered phenols, phosphorus, and/or sulfur can also be added.

It is often useful to further stabilize the composition according to the present invention with regard to penetrating moisture, in order to enhance shelf life even further. Such improvement in shelf life can be achieved, for example, with the use of drying agents. Suitable as drying agents are all compounds that react with water to form a group that is inert with respect to the reactive groups present in the preparation, and in that context experience as little change as possible in their molecular weight. In addition, the reactivity of the drying agent with respect to moisture that has penetrated into the preparation must be greater than the reactivity of the terminal groups of the silyl-group-carrying polymers according to the present invention that are present in the preparation. Isocyanates, for example, are suitable as drying agents.

Advantageously, silanes are also used as a drying agent, for example vinylsilanes such as 3-vinylpropyltriethoxysilane, oximosilanes such as methyl-O,O',O"-butan-2-onetrioximosilane or O,O', O", O'"-butan-2-onetetraoximosilane (CAS nos. 022984-54-9 and 034206-40-1) or benzamidosilanes such as bis(N-methylbenzamido)methylethoxysilane (CAS no. 16230-35-6) or carbamatosilanes such as carbamatomethyltrimethoxysilane. The use of methyl-, ethyl- or vinyltrimethoxysilane, tetramethyl- or -ethylethoxysilane is, however, also possible. Vinyltrimethoxysilane and tetraethoxysilane are particularly preferred here in terms of efficiency and cost. The reactive diluents recited above are likewise suitable as drying agents, provided they have a molecular weight ($M_n$) of less than approximately 5000 g/mol and possess terminal groups whose reactivity with respect to moisture that has penetrated is at least as great as, preferably greater than, the reactivity of the reactive groups of the silyl-group-carrying polymer according to the present invention. Lastly, alkyl orthoformates or alkyl orthoacetates can also be used as drying agents, for example methyl or ethyl orthoformate, methyl or ethyl orthoacetate. The composition according to the present invention contains by preference approximately 0.01 to 10 wt % drying agent, based on the total weight of the composition.

The composition according to the present invention by preference contains the following constituents in the weight proportions indicated: at least one polymer of the general formula (I): 5 to 75 wt %,
at least one cyclic compound that contains at least one structural motif of the general formula (II) as a constituent of the ring structure: 0.01 to 1 wt %, at least one cyclohexanedicarboxylic acid dialkyl ester in which the alkyl residues of the ester groups each, mutually independently, contain 1 to 20 carbon atoms: 1 to 45 wt %,
one or more filler(s): 1 to 80 wt %,
one or more adjuvant(s): 0 to 10 wt %,
where the weight proportions add up to 100 wt % and the weight proportions are based on the total weight of the curable composition.

The composition according to the present invention can contain as adjuvants, for example, in addition to the constituents already listed, stabilizers, UV stabilizers, aging protection agents, rheological adjuvants, color pigments or color pastes, fungicides, flame retardants, and/or optionally solvents to a small extent.

The composition according to the present invention is manufactured using known methods, by intimately mixing the constituents in suitable dispersion units, for example a high-speed mixer.

A further subject of the present invention is the use of a combination of a cyclohexanedicarboxylic acid dialkyl ester, in which the alkyl residues of the ester groups each, mutually independently, contain 1 to 20 carbon atoms, with a cyclic compound that contains at least one structural motif of the general formula (II)

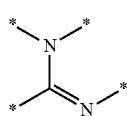

(II)

as a constituent of the ring structure, as a plasticizer/curing catalyst system in curable compositions. It is particularly advantageous to use a combination of diisononylcyclohexane-1,2-dicarboxylic acid ester (DINCH) with 1,8-diazabicyclo(5.4.0)undec-7-ene (DBU) as a plasticizer/curing catalyst system in curable compositions, in particular in curable compositions that contain silane-terminated polymers. A "silane-terminated polymer" is understood here as a polymer that carries at least one terminus a silyl group that in turn has at least one hydrolyzable substituent. Polymers having terminal groups of the general formula (I) described above of course fall under this definition. It is very particularly preferred to use a combination of diisononylcyclohexane-1,2-dicarboxylic acid ester (DINCH) with 1,8-diazabicyclo(5.4.0)undec-7-ene (DBU) as a plasticizer/curing catalyst system in curable compositions that contain at least one polymer having at least one terminal group of the general formula (I)

-$A_n$-R—SiXYZ     (I), in which
A is a divalent bonding group containing at least one heteroatom,
R is a divalent hydrocarbon residue having 1 to 12 carbon atoms, and
X, Y, Z are substituents on the Si atom and, mutually independently, are $C_1$ to $C_8$ alkyl, $C_1$ to $C_8$ alkoxy, or $C_1$ to $C_8$ acyloxy groups, where at least one of the residues X, Y, Z is a $C_1$ to $C_8$ alkoxy or $C_1$ to $C_8$ acyloxy group, and
n is 0 or 1.

A further subject of the present invention is the use of a curable composition according to the invention as an adhesive, sealant, and/or coating material.

In principle, all features set forth in the context of the present text, in particular the embodiments, proportion ranges, constituents, and other features identified as preferred and/or special, of the composition according to the present invention and of the uses according to the present invention, can be implemented in the present invention in all possible combinations that are not mutually exclusive, in which context of features identified as preferred and/or special are likewise to be regarded as preferred and/or special.

EXAMPLES

General Procedure for Manufacturing the Polymers 282 g (15 mmol) polypropylene glycol 18000 (OH number=6.0) was dried in a 500 ml three-neck flask at 100° C. under vacuum. Under a nitrogen atmosphere at 80° C., 0.1 g catalyst (polymer 1a: dibutyltin laurate; polymer 1b: bismuth neodecanoate preparation (Catalyst 315 of OMG Borchers)) was added, and 7.2 g (32 mmol) 3-isocyanatopropyltrimethoxysilane (NCO content=18.4%) was then added to it. After stirring for one hour at 80° C., the resulting polymer was cooled and then had 6 g vinyltrimethoxysilane and 3 g Irganox 245 added to it.

General procedure for manufacturing the curable compositions (see Table 1 below for quantities and indications as to identity of components):

The respective polymer 1 is intimately mixed with the corresponding component 2 in a Speedmixer for 30 seconds. The respective components 3 to 9 are introduced successively into that mixture. The mixture thereby produced is intimately mixed for 30 seconds in a Speedmixer.

Test Methods

Mechanical Data:

The mixtures respectively obtained in accordance with the procedure above were tested in accordance with ISO 8339-A using aluminum as substrate, the modulus and elongation at fracture being determined. The Shore A hardness was also determined in accordance with ISO 868.

DBU Migration Test:

A bead (approx. 15 mm wide, approx. 5 mm thick, approx. 80 mm long) is applied at room temperature onto a glass plate, and then stored at 23° C. and 50% relative humidity. The test articles are checked after 7 and 28 days for the presence of migration phenomena in the form of a greasy film on the glass plate and on the surface of the test article. If migration phenomena occur, the test article is scored "not OK"; otherwise it is scored "OK".

Tensile Shear Test—Measuring Breaking Strength:

To allow the curing behavior of catalyzed adhesives and sealants to be observed over time, the development of the breaking strength over time is observed. Test articles that are made up of two overlappingly bonded wood panels are produced for this purpose. These are then extended in a tensile tester to breakage, and the force required is measured.

Producing the Test Articles for the Tensile Shear Test:

Three test articles are needed for each measurement. A beech plywood panel (80×40×4 mm, seasoned at 23° C., 50% relative humidity) is coated over half its width (20 mm) with the adhesive/sealant to be tested. Four metals balls 2 mm thick are placed into the adhesive/sealant film as spacers. A second plywood panel is then laid onto the adhesive/sealant and pressed together by hand until an adhesive/sealant film 2 mm thick (defined by the metal balls) is produced between the two plywood panels. Material emerging from the sides is removed with a spatula. The test articles are then stored at 23° C. for varying times. Storage occurs on polyethylene film, each of the three test articles being loaded with an approximately 300 g weight.

Tensile Test—Performing the Measurement:

After 1, 2, 4, 8, 16, 24, and 48 hours, the test articles are elongated in an Erichsen tensile tester until breakage. The maximum force value is determined, and an average value for each time unit is calculated from the three measurements.

TABLE 1

Compositions (indications in wt %)

| No. | Component | Ex. 1 | Ex. 2 | Ex. 3 | Ex. 4 | Ex. 5 | Ex. 6 | Ex. 7 |
|---|---|---|---|---|---|---|---|---|
| 1 | Polymer 1a | 20 | 20 | | 20 | 20 | 20 | 20 |
| 1 | Polymer 1b | | | 20 | | | | |
| 2 | Diisononylcyclohexane-1,2-dicarboxylic acid diester | | 25 | 25 | 25 | 25 | 25 | 25 |
| 2 | Diisoundecyl phthalate | 25 | | | | | | |
| 3 | Calcium carbonate coated with stearic acid | 30 | 30 | 30 | 30 | 30 | 30 | 30 |
| 3 | Calcium carbonate, uncoated | 15 | 15 | 15 | 13.9 | 13.9 | 13.9 | 13.9 |
| 4 | Titanium dioxide | 2.9 | 2.9 | 2.9 | 2.9 | 2.9 | 2.9 | 2.9 |
| 5 | Hydrogenated castor oil | 4.5 | 4.5 | 4.5 | 5 | 5 | 5 | 5 |
| 6 | Vinyltrimethoxysilane | 1.5 | 1.5 | 1.5 | 1.5 | 1.5 | 1.5 | 1.5 |
| 7 | 3-Aminopropyltrimethoxysilane | 0.5 | 0.5 | 0.5 | 0.5 | 0.5 | 0.5 | 0.5 |
| 8 | Adjuvants (UV absorber + alkylpolysiloxane) | 0.5 | 0.5 | 0.5 | 1.1 | 1.1 | 1.1 | 1.1 |
| 9 | DBU | 0.1 | 0.1 | 0.1 | 0.1 | | | |
| 9 | Sn catalyst (Metatin catalyst 740) | | | | | 0.1 | | |
| 9 | Ti catalyst (Tyzor TnBT) | | | | | | 0.1 | |
| 9 | Zr catalyst (Vertec VEXP 0588) | | | | | | | 0.1 |
| | Total | 100 | 100 | 100 | 100 | 100 | 100 | 100 |

Ex. = Example
Examples 1, 5, 6, and 7: Not according to the invention
Examples 2, 3, and 4: According to the invention Results

TABLE 2

Test results

| Parameter | Unit | Method | Ex. 1 | Ex. 2 | Ex. 3 |
|---|---|---|---|---|---|
| Skin-over | min | 23° C./50% RH | 35 | 40 | 23 |
| Shore A hardness | — | ISO 868 | 39 | 31 | 32 |
| Modulus 100% | N/mm² | ISO 8339-A (aluminum) | 0.77 | 0.54 | 0.59 |
| Elongation at fracture | % | ISO 8339-A (aluminum) | 260 | 535 | 450 |
| DBU migration | OK, not OK | see above | not OK | OK | OK |

The results in Table 2 show clearly that the compositions according to the present invention exhibit good hardness values along with definitely improved elastic properties (modulus, elongation at fracture), and moreover exhibit no DBU migration phenomena such as those that occur with the composition not according to the present invention.

Tensile Test—Results (See FIG. 1)

FIG. 1 shows the values, ascertained in accordance with the method described in further detail above, for breaking strength as a function of time at which the measurement was carried out, the last value having been determined 48 hours after adhesive bonding had occurred. The curves for Examples 6 and 7 (titanium resp. zirconium catalyst) show that satisfactory curing is not achieved with the corresponding catalysts. The curve obtained for Example 4 according to the present invention, on the other hand, shows that with DBU, a catalytic activity is achieved which is equivalent to resp. even exceeds the activity of a conventional tin catalyst (Example 5).

The invention claimed is:

1. A curable composition consisting of
A) at least one polymer having at least one terminal group of the general formula (I)

in which
A is a divalent bonding group containing at least one heteroatom,
R is a divalent hydrocarbon residue having 1 to 12 carbon atoms, and
X, Y, Z are substituents on the Si atom and, mutually independently, are $C_1$ to $C_8$ alkyl, $C_1$ to $C_8$ alkoxy, or $C_1$ to $C_8$ acyloxy groups, where at least one of the residues X, Y, Z is a $C_1$ to $C_8$ alkoxy or $C_1$ to $C_8$ acyloxy group, and
n is 0 or 1;
B) at least one cyclic compound that contains at least one structural motif of formula (II)

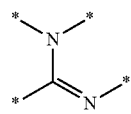

as a constituent of the ring structure;
C) at least one cyclohexanedicarboxylic acid dialkyl ester in which the alkyl residues of the ester groups each, mutually independently, contain 1 to 20 carbon atoms;
D) optionally one or more fillers;
E) optionally one or more plasticizers selected from the group consisting of a fatty acid ester, a dicarboxylic acid ester except for cyclohexanedicarboxylic acid dialkyl esters, an ester of OH-group-carrying or epoxidized fatty acids, a fat, a glycolic acid ester, a benzoic acid ester, a sulfonic acid ester, a trimellitic acid ester, an epoxidized plasticizer, a polyether plasticizer, a polystyrene, a hydrocarbon plasticizer, a chlorinated paraffin and mixtures thereof; and F) optionally one or more adjuvants selected from the group consisting of reactive diluent, solvent, adhesion promoter, tackifier, antioxidant, drying agent, UV stabilizer, aging protection agent, rheological adjuvant, color pigment or color paste, fungicide and flame retardant.

2. The curable composition according to claim 1, wherein the divalent bonding group A in the general formula (I) is an oxygen atom, an —NR' group, in which R' is a hydrogen atom or an alkyl or aryl residue having 1 to 12 carbon atoms, or is an amide, carbamate, urea, imino, carboxylate, carbamoyl, amidino, carbonate, sulfonate, or sulfinate group.

3. The curable composition according to claim 1, wherein the residues X, Y, Z in the general formula (I) are, mutually independently in each case, a methyl, an ethyl, a methoxy, or an ethoxy group, where at least one of the residues is a methoxy or ethoxy group.

4. The curable composition according to claim 1, wherein R in the general formula (I) is a methylene, ethylene, or n-propylene group.

5. The curable composition according to claim 1, wherein the cyclohexanedicarboxylic acid dialkyl ester has identical alkyl residues in the ester groups.

6. The curable composition according to claim 1, wherein the
B) at least one cyclic compound consists of 1,5-diazabicyclol[4.3.0]non-5-ene (DBN) or 1,8-diazabicyclo (5.4.0)undec-7-ene (DBU).

7. The curable composition according to claim 1, wherein the composition consists of the following constituents in the weight proportions indicated:
the A) at least one polymer of the general formula (I): 5 to 75 wt %,
the B) at least one cyclic compound: 0.01 to 1 wt %,
the C) at least one cyclohexanedicarboxylic acid dialkyl ester in which the alkyl residues of the ester groups each, mutually independently, contain 1 to 20 carbon atoms: 1 to 45 wt %,
the D) one or more filler(s): 1 to 80 wt %,
optionally the F) one or more adjuvant(s): 0 to 10 wt %,
where the weight proportions add up to 100 wt % and the weight proportions are based on the total weight of the curable composition.

8. An adhesive, sealant, or coating material comprising the curable composition according to claim 1.

9. The curable composition according to claim 1, being free of phthalic acid esters and organotin compounds.

10. The curable composition according to claim 1, positively including the D) one or more fillers, the E) one or more plasticizers and the F) one or more adjuvants.

11. A curable composition comprising:
A) at least one polymer having at least one terminal group of the general formula (I)

$$-A_n-R-SiXYZ \qquad (I),$$

in which
A is a divalent bonding group containing at least one heteroatom,
R is a divalent hydrocarbon residue having 1 to 12 carbon atoms, and
X, Y, Z are substituents on the Si atom and, mutually independently, are $C_1$ to $C_8$ alkyl, $C_1$ to $C_8$ alkoxy, or $C_1$ to $C_8$ acyloxy groups, where at least one of the residues X, Y, Z is a $C_1$ to $C_8$ alkoxy or $C_1$ to $C_8$ acyloxy group, and
n is 0 or 1;
B) at least one cyclic compound selected from the group consisting of 1,2-dimethyl-1,4,5,6-tetrahydropyrimidine, 1-ethyl-2-methyl-1,4,5,6-tetrahydropyrimidine, 1, 2-diethyl-1,4,5,6-tetrahydropyrimidine, 1-n-propyl-2-methyl 1,4,5,6-tetrahydropyrimidine, 1-isopropyl-2-methyl-1,4,5,6-tetrahydropyrimidine, 1-ethyl 2-n-propyl-1,4,5,6-tetrahydropyrimidine, 1-ethyl-2-isopropyl-1,4,5,6-tetrahydropyrimidine, 1,5,7-triazabicyclo[4.4.0]-dec-5-ene, 7-methyl-1,5,7-triazabicyclo[4.4.0]-dec-5-ene, 7-ethyl-1,5,7-triazabicyclo[4.4.0]-dec-5-ene, 7-n-propyl-1,5,7-triazabicyclo[4.4.0]-dec-5-ene, 7-isopropyl-1,5,7-triazabicyclo[4.4.0]-dec-5-ene, 7-n-butyl 1,5,7-triazabicyclo[4.4.0]-dec-5-ene, 7-isobutyl-1,5,7-triazabicyclo[4.4.0]-dec-5-ene, 7-tert-butyl-1,5, 7-triazabicyclo[4.4.0]-dec-5-ene, 7-cyclohexyl-1,5,7-triazabicyclo[4.4.0]-dec-5-ene, 7-n-octyl-1,5,7-triazabicyclo[4.4.0]-dec-5-ene and 7-2-ethylhexyl-1,5, 7-triazabicyclo[4.4.0]dec-5-ene;
C) at least one cyclohexanedicarboxylic acid dialkyl ester in which the alkyl residues of the ester groups each, mutually independently, contain 1 to 20 carbon atoms
D) optionally one or more fillers;
E) optionally one or more plasticizers selected from the group consisting of a fatty acid ester, a dicarboxylic acid ester except for cyclohexanedicarboxylic acid dialkyl esters, an ester of OH-group-carrying or epoxidized fatty acids, a fat, a glycolic acid ester, a benzoic acid ester, a sulfonic acid ester, a trimellitic acid ester, an epoxidized plasticizer, a polyether plasticizer, a polystyrene, a hydrocarbon plasticizer, a chlorinated paraffin and mixtures thereof; and
F) optionally one or more adjuvants selected from the group consisting of reactive diluent, solvent, adhesion promoter, tackifier, antioxidant, drying agent, stabilizer, UV stabilizer, aging protection agent, rheological adjuvant, color pigment or color paste, fungicide and flame retardant.

* * * * *

UNITED STATES PATENT AND TRADEMARK OFFICE
CERTIFICATE OF CORRECTION

PATENT NO. : 10,336,863 B2  
APPLICATION NO. : 13/839697  
DATED : July 2, 2019  
INVENTOR(S) : Andreas Bolt et al.

Page 1 of 1

It is certified that error appears in the above-identified patent and that said Letters Patent is hereby corrected as shown below:

On the Title Page

Item (54) and in the Specification Column 1, Line 1, Change "Curable Composition Having a Special Catalyst/Softner System" to -- Curable Composition Having a Special Catalyst/Softener System --.

In the Specification

Column 10, Line 43: Change "10 Trimethoxy" to -- IO Trimethoxy --.

Column 10, Line 44: Change "10 Triethoxy" to -- IO Triethoxy --.

Column 11, Line 14: Change "2,6-hexahydrotoluoylene" to -- 2,6-hexahydrotoluylene --.

Column 11, Line 20: Change "2,6-toluoylene" to -- 2,6-toluylene --.

Signed and Sealed this  
Tenth Day of March, 2020

Andrei Iancu  
*Director of the United States Patent and Trademark Office*